UNITED STATES PATENT OFFICE.

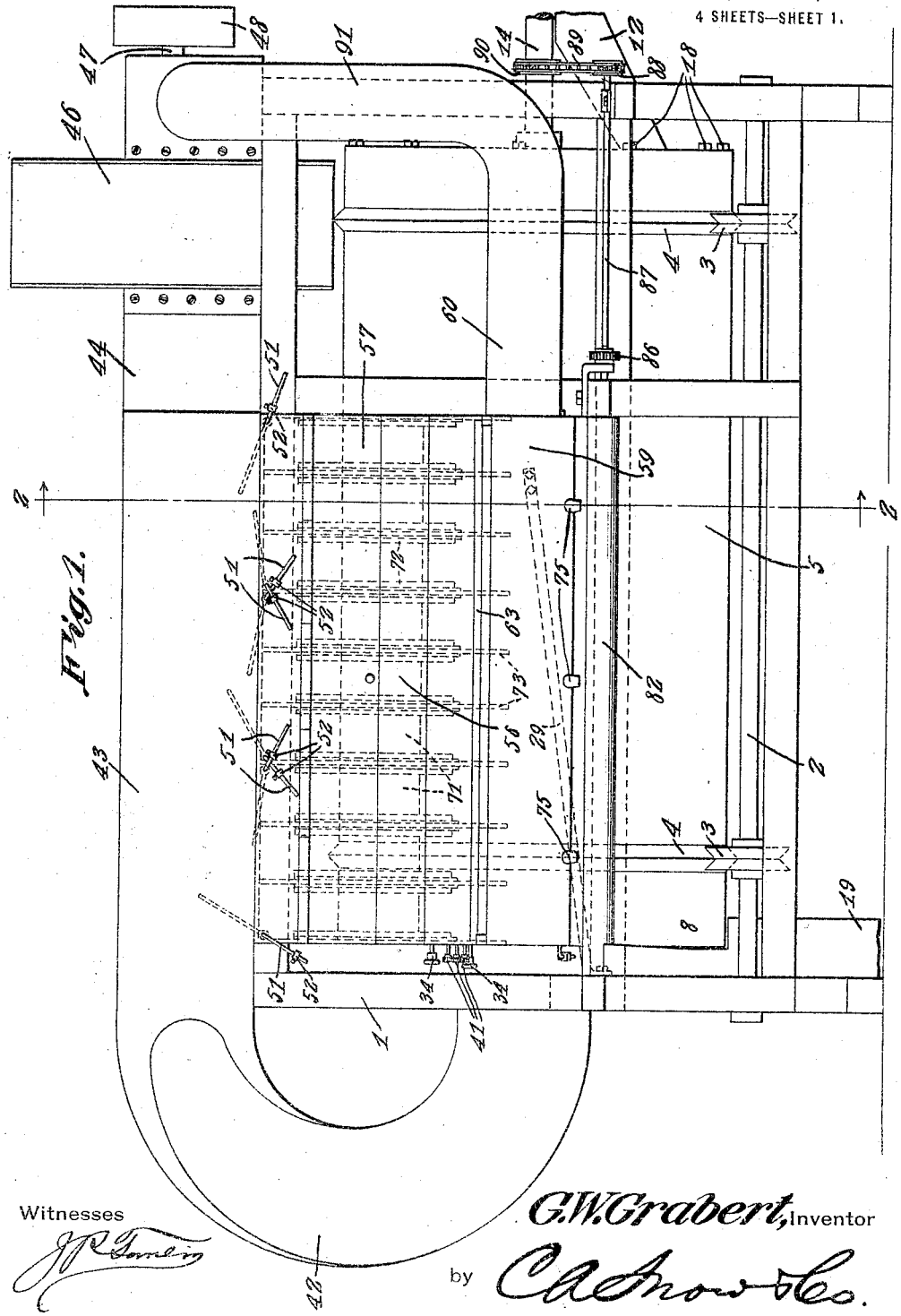

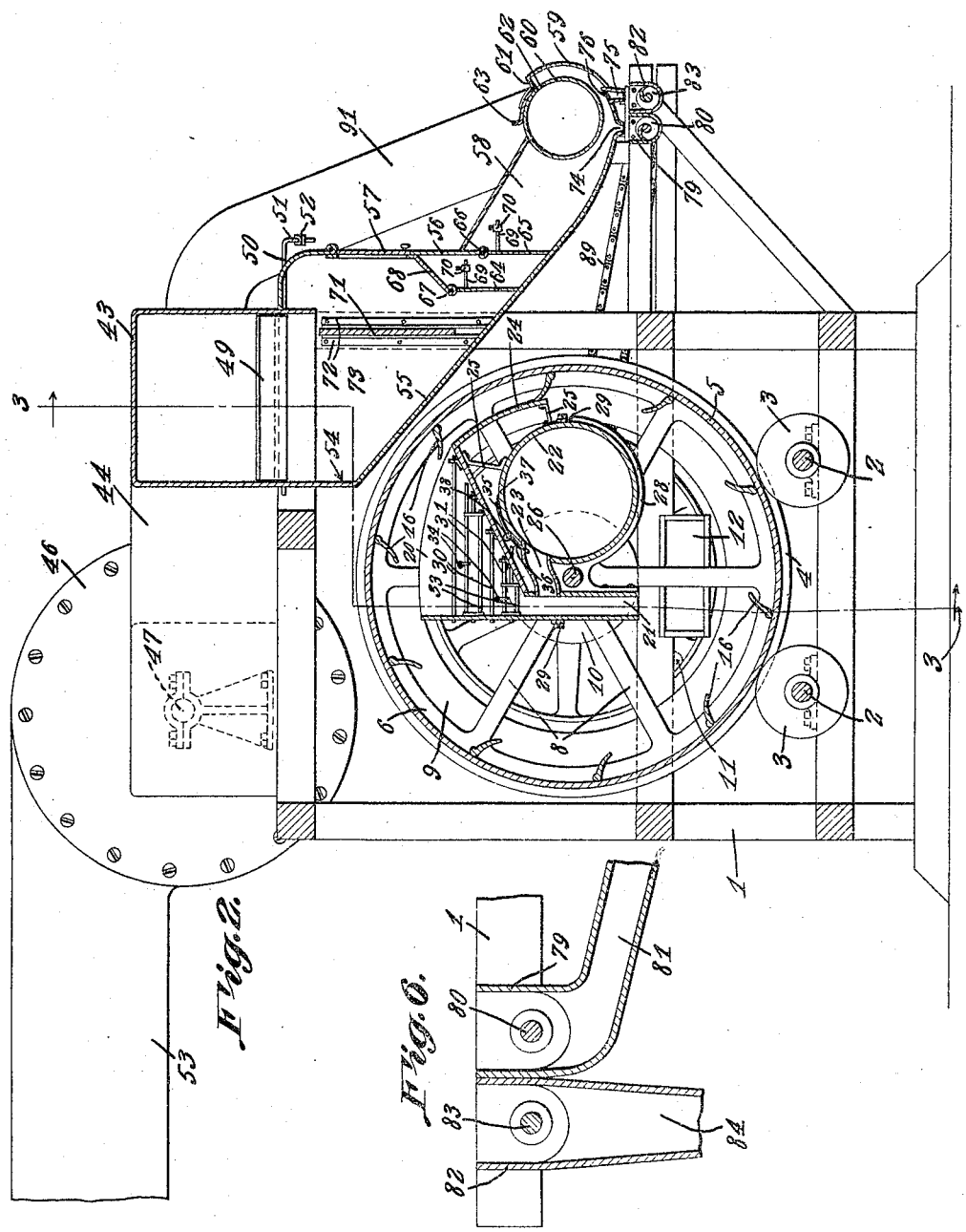

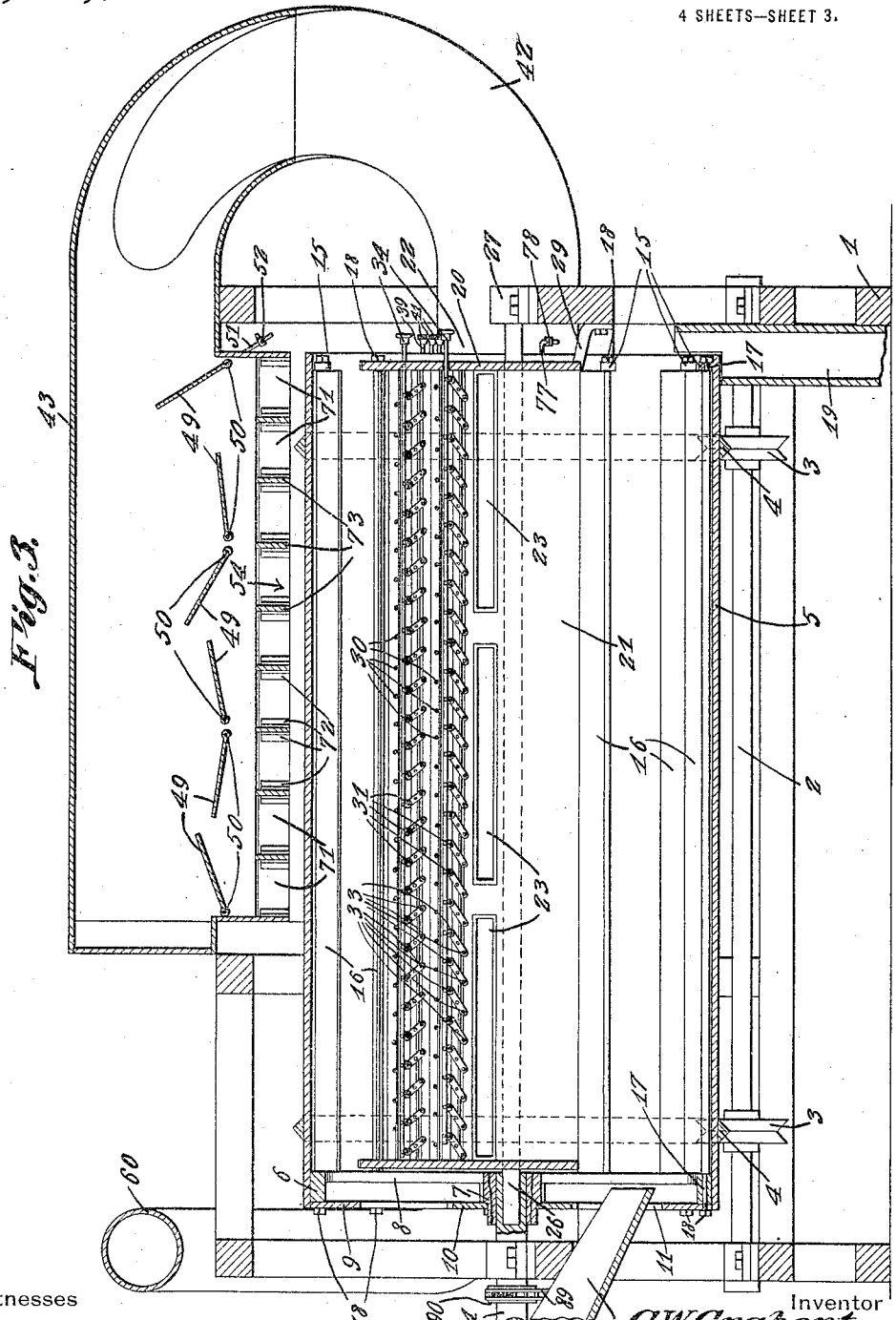

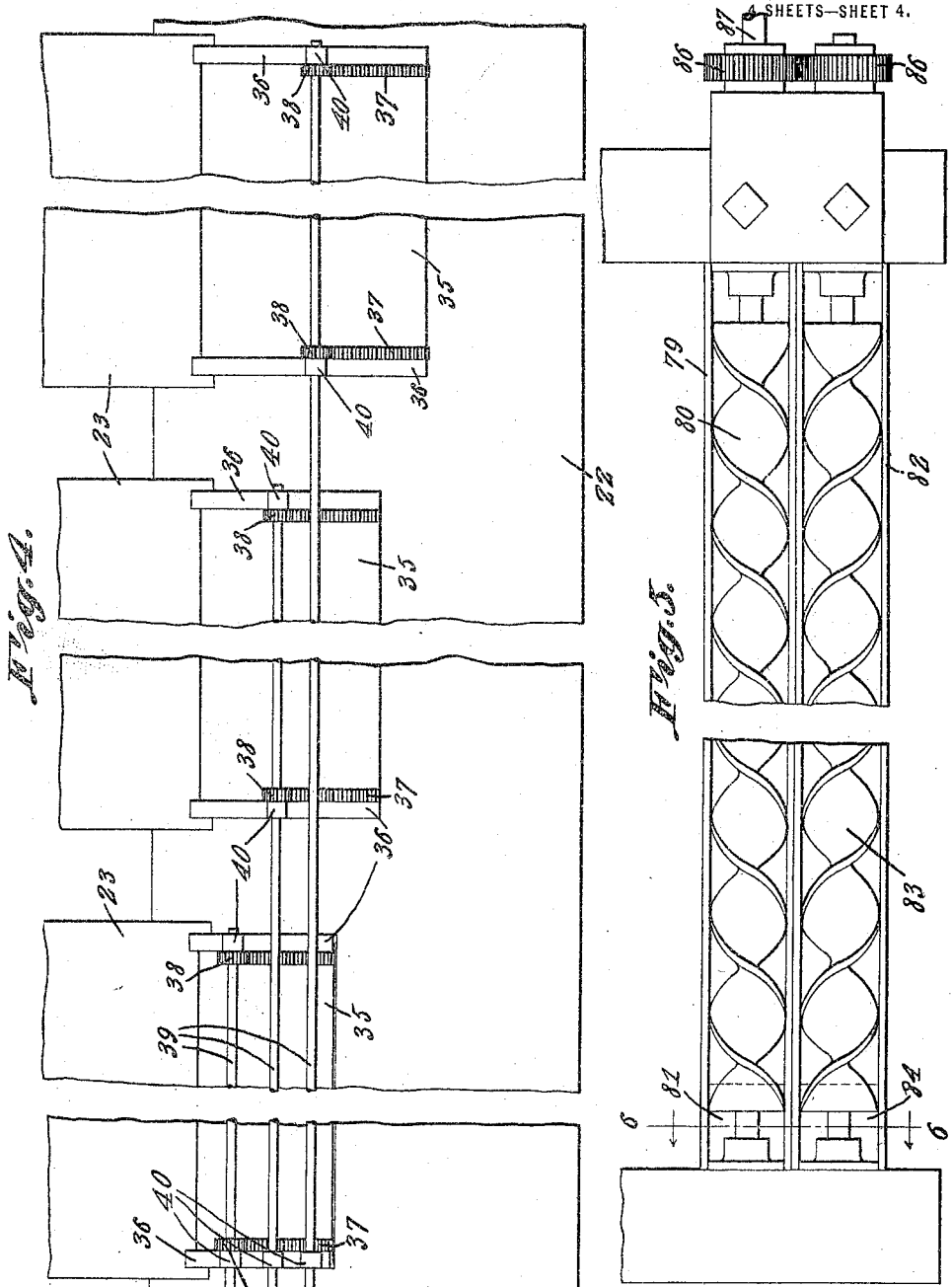

GUSTAVE W. GRABERT, OF MOUNT VERNON, INDIANA, ASSIGNOR OF ONE-HALF TO SAMUEL J. MILLER, OF MOUNT VERNON, INDIANA.

GRAIN-CLEANER.

1,296,791. Specification of Letters Patent. Patented Mar. 11, 1919.

Application filed December 7, 1917. Serial No. 206,005.

*To all whom it may concern:*

Be it known that I, GUSTAVE W. GRABERT, a citizen of the United States, residing at Mount Vernon, in the county of Posey and State of Indiana, have invented a new and useful Grain-Cleaner, of which the following is a specification.

The machine forming the subject matter of this application is adapted to be employed for separating wild onions or garlic from wheat, and operates upon the known theory that a wild onion or garlic offers less resistance to an air current than does a grain of wheat of the same size.

The invention aims to provide novel means whereby, through the operation of a current of air, garlic or wild onions will be separated from wheat, any wheat which happens to be carried over along with the wild onions or garlic being separated therefrom by repeated steps in the operation of the structure.

It is within the province of this disclosure to improve generally and to enhance the utility of devices of the character to which the present invention appertains.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 shows in side elevation, a machine constructed in accordance with the present invention;

Fig. 2 is a section on the line 2—2 of Fig. 1;

Fig. 3 is a section on the line 3—3 of Fig. 2;

Fig. 4 is a fragmental top plan showing a portion of the suction conduit and adjacent parts;

Fig. 5 is a fragmental top plan showing the conveyers and the attending parts; and Fig. 6 is a section taken approximately on the line 6—6 of Fig. 5.

In carrying out the present invention there is provided a frame 1 which may be of any desired sort. Shafts 2 are journaled for rotation on the frame 1 and carry grooved wheels 3 receiving annular tracks 4 on a drum 5, the drum being supported in this way for rotation. At its inlet end, drum 5 is supplied with a rim 6, a hub 7, and spokes 8 connecting the rim with the hub. An annular end plate 9 is secured to the rim 6, and an annular end plate 10 is secured to the hub 7, there being an annular space 11 between the inner edges of the plates 9 and 10, at the intake end of the drum. Into the space 11 projects a chute 12 discharging into the drum 5. The drum 5 is rotated by means of a shaft 14 connected with the hub 7. Adjacent its outlet end, the drum 5 is provided interiorly with lugs 15. Blades 16 extend longitudinally of the drum 5 in the interior thereof, the blades being provided with end trunnions 17 mounted to rotate, for adjustment, in the lugs 15 and in the rim 6. The construction is such that the blades 16 may be set at any desired angle with respect to the walls of the drum 5, it being possible to hold the blades in adjusted positions by tightening nuts 18 which, being mounted on the trunnions 17, coöperate with the lugs 15 and with the rim 6. The outlet end of the drum 5 discharges into a depending chute 19 connected with the frame 1.

Disposed within the drum 5 and extended longitudinally thereof is a downwardly tapered hopper 20 having a reduced discharge neck 21. The numeral 22 marks a suction conduit extended longitudinally of the drum 5 and connected with the neck 21 by means of inlet flues 23. A back plate 24 extends from one edge of the hopper 20. Braces 25 connect the back plate 24 with the conduit 22 and connect the conduit 22 with the bottom portion of the hopper 20. The numeral 26 marks a rod or support, one end of which is received in the shaft 14, the construction being such that the shaft can rotate on the rod. The other end of the rod 26 is engaged by a journal 27 mounted on the frame 1. The rod or support 26 carries any desired number of brackets 28 connected to the discharge neck 21 and to the suction conduit 22. The neck 21 and the conduit 22 may be supported and braced, further, by means of rods 29, the outer ends of which are attached to the frame 1.

Fixed baffles 30, preferably in the form of rods, extend across the hopper 20 transversely and are terminally secured thereto. Other baffles are disposed below the fixed baffles 30, said other baffles having their ends journaled in the hopper. The last specified baffles comprise upper rods 30, lower rods 33 and connections uniting the rods 31 and 33. Operating members, in the form of rods 34, extend longitudinally of the hopper 20, and are pivotally connected to the rods 31, eccentrically, so that when the rods 34 are moved endwise, the baffles comprising the rods 31 and 33 may be tilted longitudinally of the hopper, thus to direct the material longitudinally of the hopper, after the material has engaged the fixed baffles 30.

Dampers 35 slide beneath guides 36 on the suction conduit 22 and control the inlet flues 23, the dampers carrying racks 37 engaged by pinions 38 on shafts 39 journaled in bearings 40 on the guides 36, the shafts 39 being rotated by means of hand wheels 41.

The operation of the structure as thus far described will now be set forth:—

The wheat and garlic pass into the drum 5 through the chute 12, and if the drum is rotated by means of the shaft 14, the blades 16, being set at any desired angle, pick up the wheat and the garlic and elevate it, the mixture being dropped into the hopper 20. The mixture of wheat and garlic scatters down over the baffles 30, 31 and 33 and is separated thereby. The operating rods 34 may be moved endwise, rotating the baffles 31 and swinging the movable baffles 33 laterally. As the consequence of the operation last above described, the baffles 33 may be moved laterally with respect to the baffles 31 and 30 to any desired extent, so as to regulate the passage of the mixture, as the same flows downwardly. From the hopper 20, the mixture passes into the discharge neck 21 and as the mixture flows past the flues 23, the garlic will be sucked out of the wheat and will pass into the conduit 22, presupposing there is a suction in the conduit. Some of the wheat, also, may pass into the conduit 22 along with the garlic. From the discharge neck 21, the wheat and any garlic which happens to remain in the wheat flows into drum 5, to be picked up again by the blades 16, the blades depositing the mixture in the hopper 20, this process being repeated again and again, until, by the time that the wheat flows out of the discharge end of the drum 5, all of the garlic has been removed from the wheat. The clean wheat flows out of the discharge end of the drum 5 into the chute 19 where the wheat may be bagged or disposed of otherwise.

The suction conduit 22 is extended upwardly as shown at 42 and merges into a top member 43 supported by the frame 1, the top member slanting horizontally as shown at 44, and connecting with one side of a combined suction and blower device 46 carried by the frame 1. The shaft of the suction and blower device is shown at 47 and may be driven by a pulley 48 or in any other suitable way. The outlet for the suction and blower device appears at 53. The top member 43 is open at the bottom and near to the bottom of the top member, dampers 49 are arranged, the same being carried by transverse shafts 50 journaled in the top member. Exteriorly of the top member 43 the shafts 50 are provided with arms 51 carrying adjustable counterweights 52.

The garlic and any wheat which may have been received in the conduit 22 through the inlet flues 23 is carried by suction up the bend 42 of the conduit into the top member 43. By adjusting the counterweights 52 on the arms 51, the dampers 49 may be set at any desired angle and may be so arranged as to tilt, if desired, when a sufficient quantity of material has accumulated thereon. The mixture of wheat and garlic passes across the dampers 49, the wheat, and in some cases some of the garlic, passing downwardly across the edges of the dampers 49. The segregated garlic, however, traverses the inclined end 44 of the top member 43, enters the casing of the suction and blower device 46, and is discharged through the outlet 53.

A receiver 54 is located below the top member 43 and is connected therewith, the receiver including a slanting bottom 55 and an outer wall 56 carrying a door 57, there being transverse partitions 73 in the receiver, the partions carrying guides 72 in which upright baffles 71 may be mounted adjustably. The receiver 54 merges into an inclined extension 58 having an end wall 59 in which is disposed a suction tube 60, the end wall 59 having a flange 61 connected to the suction tube, and there being an opening 62 in the suction tube, adjacent to the flange. The size of the opening 62 is regulated by a damper 63 mounted slidably upon the exposed portion of suction tube 60. Swinging baffles 64 and 65 are arranged, respectively, in the lower portion of the receiver 54 and in the extension 58. The baffle 65 is pivoted at 66 to the lower edge of the wall 56, the baffle 64 being pivoted as shown in 67 to a lip 68 extending from the wall 56. The baffles 64 and 65 have arms 69 on which counterweights 70 are adjustable. The door 57 gives access to the counterweights 65. The bottom of the extension 58 is provided with an outlet 74, and with an outlet 75 arranged beyond the outlet 74, the outlet 75 being controlled by a poised damper 76 including an arm 77 carrying adjustable counterweight 78. A casing 79 is disposed below the outlet 74 and receives the material from the outlet 74, a conveyer 80 being mounted to rotate in the casing 79. The casing 79 has a connection 81 leading to the chute 19. A casing 82 is located alongside the casing 79 and is carried by the frame 1, a conveyer 83 being mounted to rotate in the casing, the casing 82 having an outlet 84 as shown in Fig. 6, and the shafts of the conveyers being operatively united by means of intermeshing pinions 86. The shaft 87 of the conveyer 80 is provided with a sprocket wheel 88 around which is trained a chain 89, engaged with a sprocket wheel 90 on the shaft 14 which operates the drum 5. The suction tube 60 is extended outwardly and upwardly, as shown at 91, and connects with the casing of the suction and blower device 46.

The wheat and garlic passing the dampers 49 moves downwardly into the receiver 54 where it is held back and regulated in its passage by the baffles 71 and by the baffles 64 and 65, the latter yielding when a sufficient amount of material has accumulated thereagainst, and it being possible to regulate the baffles 64 and 65 by adjusting weights 70 on the arms 69. The mixture passes downwardly to the opening 74, where the wheat drops downwardly into the casing 79 and is moved by the conveyer 80 to the connection 81, the wheat flowing thence into the chute 19. The garlic passes onwardly to the yielding dampers 76 and flows by way of the outlet 75 into the casing 82, the garlic being advanced by the conveyer 83 and passing ultimately through outlet 84. The garlic which does not pass through the outlet 75 when the damper 76 yields, is sucked upwardly between end wall 59 of the extension 58 and the tube 60, the garlic passing into the tube through the opening 62, it being possible to regulate the size of the opening 62 by adjusting the damper 63. From the tube 60, the garlic traverses the end 91, due to the suction created by the member 46, and is delivered into the casing of the member 46, the garlic ultimately passing out through the discharge element 53 of the suction and blower device.

The operation of the device has been dealt with hereinbefore, step by step, but a brief résumé may profitably be given at this point:—

When the drum 5 is rotated, the mixture of wheat and garlic is elevated by the blades 16, and passes repeatedly through the hopper 20, the mixture being subjected to suction produced in the conduit 22, the garlic and some of the wheat passing into the conduit, and the remaining portion of the wheat passing out of the discharge end of the drum into the chute 19. From the suction conduit 22, the material passes by way of the bend 42 to the top member 43, where another portion of the garlic is removed by suction through the end of the top member 43, the garlic passing out of the outlet 53. The mixture which passes downwardly over the dampers 49 traverses the receiver 54 and its extension 58, the wheat passing through the outlet 74, some of the garlic passing through the outlet 75, and the last of the garlic passing into the suction tube 60 through the opening 62, the garlic passing thence by way of the extension 91, to the suction and blower device 46, and leaving the suction and blower device by way of the outlet 53.

Having thus described the invention, what is claimed is:—

1. In a device of the class described, a drum mounted for rotation; a fixed hopper having an open top and extended into the drum, the hopper discharging downwardly directly upon the drum; fixed baffles extended transversely of the hopper; movable baffles disposed below from the fixed baffles and tiltable longitudinally of the hopper; means for tilting the movable baffles, longitudinally of the hopper; drum-carried means for elevating material in the drum and depositing the same in the open top of the hopper; and means for applying suction to the hopper.

2. In a device of the class described, a drum mounted for rotation; a fixed hopper having an open top and extended into the drum, the hopper discharging downwardly directly upon the drum; baffles mounted in the hopper and tiltable longitudinally of the hopper, to cause the material in the hopper to move longitudinally of the hopper as the material passes downward through the hopper; means for holding the baffles in adjusted tilted position of the hopper; drum-carried means for elevating material in the drum and discharging the same into the open top of the hopper; and means for applying suction to the hopper.

3. In a device of the class described, a drum mounted for rotation; a hopper in the drum and discharging into the drum; drum carried means for elevating the material in the drum and depositing the same in the hopper; a suction conduit communicating with the hopper intermediate the ends of the hopper and extended upwardly to form a top member; means for applying suction to the top member; a receiver whereinto the top member discharges; means for controlling the flow of material from the top member to the receiver; an extension communicating with the receiver and having an outlet; and a suction tube in the extension and having an opening communicating with the extension.

4. In a device of the class described, a top member; means for discharging material into the top member; a receiver communicating with the top member and having an extension; means for controlling the flow of material from the top member into the extension; and a suction tube in the extension, the suction tube having an opening communicating with the interior of the extension, and the extension having a discharge outlet disposed adjacent the suction tube.

5. In a device of the class described, a receiver having an extension; a suction tube located inside of the extension and provided on one side with an opening communicating with the interior of the extension, the extension having an outlet disposed below the suction tube; and a pivotally mounted baffle operating in the extension upon the opposite side of the tube from the opening.

6. In a device of the class described, coöperating elements comprising a receiver and an extension; a pivotally mounted baffle located in one of the coöperating elements; a suction tube in the extension and having an opening communicating with the interior of the extension, the extension having an outlet disposed adjacent the suction tube and located between the baffle and the opening.

In testimony that I claim the foregoing as my own, I have hereto affixed my signature in the presence of two witnesses.

GUSTAVE W. GRABERT.

Witnesses:
LOUIS SCHNUR,
SAM'L J. MILLER.

Copies of this patent may be obtained for five cents each, by addressing the "Commissioner of Patents, Washington, D. C."